United States Patent
Thielert

(10) Patent No.: US 8,545,793 B2
(45) Date of Patent: Oct. 1, 2013

(54) DEVICE AND METHOD FOR CONDENSING, SEPARATING, AND STORING LIQUID SULFUR IN A CLAUS PLANT

(75) Inventor: Holger Thielert, Dortmund (DE)

(73) Assignee: Thyssenkrupp UHDE GmbH, Dortmund (DE)

( * ) Notice: Subject to any disclaimer, the term of this patent is extended or adjusted under 35 U.S.C. 154(b) by 0 days.

(21) Appl. No.: 13/636,133

(22) PCT Filed: Mar. 3, 2011

(86) PCT No.: PCT/EP2011/001058
§ 371 (c)(1),
(2), (4) Date: Sep. 20, 2012

(87) PCT Pub. No.: WO2011/116876
PCT Pub. Date: Sep. 29, 2011

(65) Prior Publication Data
US 2013/0011330 A1   Jan. 10, 2013

(30) Foreign Application Priority Data

Mar. 22, 2010   (DE) .......................... 10 2010 012 286
Mar. 26, 2010   (DE) .......................... 10 2010 013 052

(51) Int. Cl.
*C01B 17/05*   (2006.01)
*C01B 17/04*   (2006.01)
*B01D 53/78*   (2006.01)
*B01D 53/76*   (2006.01)
*B01D 53/75*   (2006.01)

(52) U.S. Cl.
USPC ................. 423/573.1; 423/574.1; 423/576.2; 422/168; 422/169; 422/170; 422/187

(58) Field of Classification Search
USPC ................ 423/573.1, 574.1, 576.2; 422/168, 422/169, 170, 187
See application file for complete search history.

(56) References Cited

U.S. PATENT DOCUMENTS

| 3,532,468 | A | 10/1970 | Beavon |
| 4,071,607 | A | 1/1978 | Hiller et al. |
| 4,198,386 | A * | 4/1980 | Laslo et al. ................ 423/574.1 |
| 6,800,261 | B1 | 10/2004 | Borsboom et al. |

FOREIGN PATENT DOCUMENTS

EP   1090675   4/2001

OTHER PUBLICATIONS

International Search Report for PCT/EP2011/001058, English translation attached to original, Both completed by the European Patent Office on Sep. 14, 2011, All together 4 Pages.

* cited by examiner

*Primary Examiner* — Timothy Vanoy
(74) *Attorney, Agent, or Firm* — Brooks Kushman P.C.

(57) ABSTRACT

A device for condensing, separating, and storing sulfur in a Claus plant. having a Claus furnace, waste heat boiler, and Claus reactor. Plant parts are supported on a floor or comparable device, and an immersion chamber is provided below the Claus plant and optionally also below a device arranged upstream for gas scrubbing. The immersion chamber receives the sulfur in a siphoning manner, wherein the excess sulfur flows at least 4.00 meters deeper from the immersion chamber into a ground-level container in which the immersion chamber is arranged. The invention further relates to a method, by means of which liquid sulfur is conducted into an immersion chamber, wherein the immersion chamber is arranged at a height level below the waste heat boiler and the Claus reactor so that the liquid sulfur reaches the immersion chamber without further pumping and overcomes a height difference of at least 4.00 meters.

15 Claims, 1 Drawing Sheet

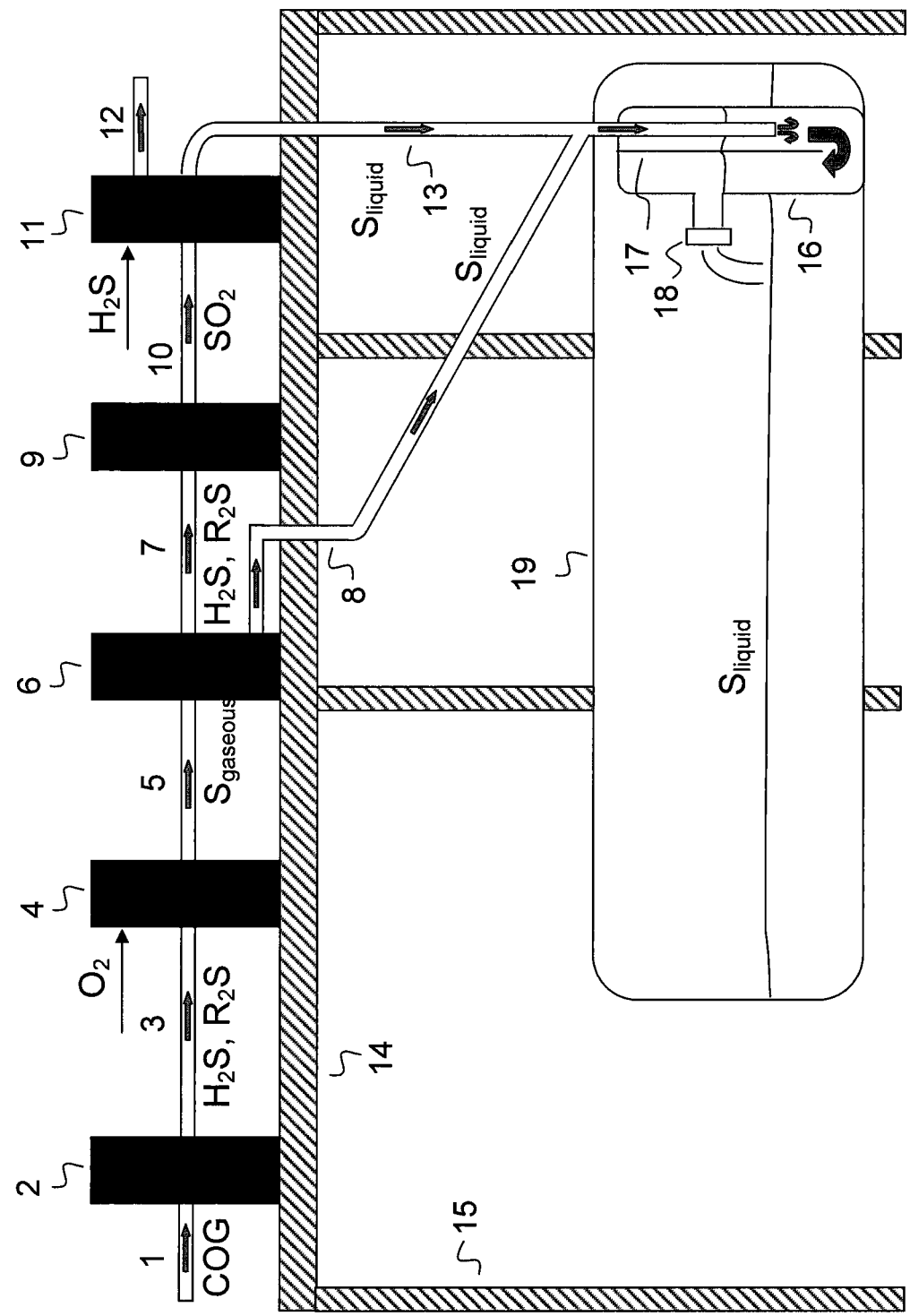

DEVICE AND METHOD FOR CONDENSING, SEPARATING, AND STORING LIQUID SULFUR IN A CLAUS PLANT

CROSS-REFERENCE TO RELATED APPLICATION

This application is the U.S. national phase of PCT Appln. No. PCT/EP2011/001058 filed on Mar. 3, 2011, which claims priority to German Patent Application No. 10 2010 012 286.6 filed on Mar. 22, 2010 and German Patent Application No. 10 2010 013 052.4 filed on Mar. 26, 2010, the disclosures of which are incorporated in their entirety by reference herein.

BACKGROUND OF THE INVENTION

1. Field of the Invention

The field of the invention is the separation, condensation, and storage of liquid sulphur from a Claus plant used to remove sulphur-containing compounds from industrial process gases, preferably coke oven gases.

2. Description of the Related Art

The production of industrial gases frequently yields a sulphur-containing gas which must be freed from sulphur compounds. Treatment is typically carried out in a gas scrubber in which the sulphur-containing gas is brought into contact with an absorption liquid which is freed again from these sulphur compounds in a subsequent desorption step such that these can be passed to a Claus process. Typical industrial gases which must be freed from sulphur compounds are coke oven gas, natural gas or refinery gases.

The Claus process allows that the sulphur compounds are converted to elemental sulphur, this conversion being started by burning the sulphur compounds with the aid of an oxygen-containing gas. This gives elemental sulphur, whereas carbon and hydrogen react to form carbon dioxide and water. The combustion gas is fed to a waste heat boiler in which the sulphur condenses to a liquid. The liquid sulphur can then be passed to a further process step or disposal. The condensed and desulphurised gas from the waste heat boiler is fed to a Claus reactor where the residual sulphur compounds are passed to a combustion stage, sulphur dioxide being obtained which, by reacting with residual hydrogen sulphide in the presence of a catalyst, is converted to elemental sulphur. The reaction step for the conversion of sulphur dioxide with hydrogen sulphide can be provided several times to achieve the maximum degree of desulphurisation.

A typical embodiment of the Claus process is disclosed in EP 1527013 B1. This teaching lays claim to a process for the separation of hydrogen sulphide from coke oven gas, in which the hydrogen sulphide is removed from the coke oven gas by gas scrubbing using an absorption liquid, the laden absorption liquid is regenerated and the laden absorption liquid and the hydrogen sulphide obtained in concentrated form are fed to the Claus plant, the hydrogen sulphide reacting with atmospheric oxygen in a Claus boiler of the Claus plant giving elemental sulphur, and the process gas leaving the Claus boiler being cooled down in a waste heat boiler to a temperature required for the condensation of the sulphur, then, after separation of the sulphur, being heated and fed to a reaction furnace of the Claus plant. In said reactor the sulphur compounds react in the presence of a catalyst to give elemental sulphur, and the process gas leaving the reaction furnace is cooled down to a temperature required for the condensation of the sulphur, and the condensed sulphur is separated, the Claus plant according to the invention being operated by one single reaction furnace only, the operating temperature of which being adjusted to less than 250° C., and the process gas leaving the reaction furnace is recycled after separation of the condensed sulphur to the coke oven gas to be treated together with residual hydrogen sulphide not converted in the reaction furnace prior to gas scrubbing. The teaching does not refer to any storage and further processing of the sulphur obtained in the process.

Normally, this sulphur is separated in liquid form and stored after solidification. The solid sulphur can be further used for versatile purposes, for example, as starting material for chemical syntheses or for the production of sulphuric acid. In the condensation of the sulphur, part of the sulphur is obtained in liquid form, whereas the remainder is still contained in the form of fine droplets in the condensed gas. To facilitate the formation of sulphur droplets of a size suitable for separation, the condensed gas can be fed to a siphon-type device where an almost complete separation of sulphur is achieved.

DE 2756992 C2 gives an example of a device which facilitates complete condensation of the sulphur contained in a sulphur-containing combustion gas. The said teaching discloses a device for the separation of sulphur droplets from a gas stream, preferably from a reaction gas stream of a Claus catalyst, this device consisting of a housing, a tube bundle arranged in the housing between the tubesheets, nozzles on the housing for the supply and discharge of a coolant flowing around the tube bundle and one gas stream inlet and outlet nozzle each on the housing on the inflow and outflow side of the tube bundle, with a separating unit, passed by the gas stream, being arranged in the housing between the tubesheet on the gas outlet side of the tube bundle and the gas outlet nozzle as well as outlets on the housing bottom on the inflow and outflow side of the separating unit for the sulphur separated upstream or in and downstream of the separating unit according to the invention. In an embodiment the device includes lines which convey the liquid sulphur from a separating unit to a sulphur collecting tank where they dip-in in a siphon-like manner.

The embodiment mentioned has the disadvantage that the sulphur withdrawn from the discharge nozzle cannot be stored but must be transported onwards in liquid form. In addition, no supply option for liquid sulphur as obtained, for example, in a waste heat boiler of a Claus plant is provided.

SUMMARY OF THE INVENTION

It is therefore the objective to provide a device which facilitates condensation of sulphur from a sulphur-containing gas, in which fine sulphur droplets contained in the gas should also condense, and a supply option for liquid sulphur already condensed from a waste heat boiler should be given. The device should also allow the storage of the sulphur.

The invention achieves the objective by a device consisting of a siphon-type immersion chamber arranged in a vessel, this vessel being arranged on a lower level than the other plant sections of the Claus plant such that the sulphur can enter the immersion chamber without the aid of an additional conveying device, and the immersion chamber being designed in a siphon-like manner such that the gas is immersed into the liquid in the vessel.

Via the outlet means arranged downstream of the siphon, the liquid sulphur flows from the immersion chamber to the vessel from where it can be transported onwards.

BRIEF DESCRIPTION OF THE DRAWINGS

FIG. 1 illustrates a schematic form, one embodiment of a Claus plant in accordance with the invention.

DETAILED DESCRIPTION OF THE PREFERRED EMBODIMENTS

The invention relates to a device for the condensation, separation and storage of sulphur in a Claus plant, the Claus plant consisting of a Claus furnace, a waste heat boiler and a Claus reactor, and these plant sections being supported on a base or a comparable device, and an immersion chamber being provided at a level below the Claus plant and, if installed, also below an upstream device for gas scrubbing, the chamber taking up the sulphur in a siphon-like manner, the excess sulphur being able to flow from the immersion chamber into a vessel housing the immersion chamber. The invention also relates to a process with the aid of which liquid sulphur is fed to an immersion chamber, the immersion chamber being arranged at a height level below the waste heat boiler and the Claus reactor such that the liquid sulphur enters the immersion chamber without the aid of an additional conveying device.

Claim is particularly laid to a device for the condensation, separation and storage of liquid sulphur, comprising
- a gas scrubbing unit by means of which the hydrogen sulphide is removed from the coke oven gas by gas scrubbing using an absorption liquid, the laden absorption liquid is regenerated and the hydrogen sulphide obtained in concentrated form is fed to the Claus plant consisting of Claus furnace, waste heat boiler and Claus reactor, and
- a Claus furnace in which the sulphur compounds are burnt with atmospheric oxygen to give elemental sulphur,
- a waste heat boiler in which the process gas leaving the Claus furnace is cooled to a temperature required for the condensation of the sulphur, is reheated after separation of the sulphur and fed to a Claus reactor,
- a Claus reactor in which part of the residual hydrogen sulphide is burnt, and the forming sulphur dioxide is converted to sulphur by reacting with residual hydrogen sulphide in the presence of a catalyst,
- a condensation chamber related to the Claus reactor, and which is characterised in that
- the Claus plant and, if required, also the gas scrubbing unit are supported on a base or a suitable device, and a siphon-type immersion chamber is arranged below such device in a heatable, ground-level vessel, and
- the Claus plant and, if required, also the gas scrubbing unit are located at a higher level than the vessel and the immersion chamber contained therein such that no conveying equipment is required for conveying the sulphur to the immersion chamber, with
- the Claus plant and, if required, also the gas scrubbing unit being located at an elevated level of at least 4.00 meters above the lowest discharge point for sulphur in the immersion chamber.

The vessel is arranged at ground level, which is to be understood as an arrangement at approximated ground level. A deep pit for lowering the vessel to a notable extent, as frequently found in Claus plants for the storage of sulphur, incurring the related costs, is not required.

In principle, the vessel and the immersion chamber can be made of any material desired. In a preferred embodiment the vessel and the immersion chamber are made of steel in order to be adequately corrosion-resistant to the temperatures of the liquid sulphur. The vessel can be heated to ensure that the sulphur contained therein is constantly kept liquid. The immersion chamber as well can be heated or thermally insulated.

In order to operate the immersion chamber in an optimum way the sulphur must also be liquid even in the immersion chamber such that the siphon can work properly. During operation this can be accomplished by supplying an adequate amount of sulphur condensate. For this purpose, the immersion chamber can also be provided with heat-insulated wall materials. If an adequate supply of liquid sulphur is not always ensured, the immersion chamber can also be equipped with a device for heating the sulphur in order to prevent the sulphur from solidifying in the immersion chamber.

Collecting or storage tanks can be allocated to the Claus plant or the vessel housing the immersion chamber, these tanks being piped to the vessel or the immersion chamber. In a preferred embodiment, the storage or collecting tank(s) as well is/are made of steel. The type of arrangement also allows for the saving of a considerable space volume.

Immersion cylinders which prevent an undesired escape of desulphurised gas in Claus plants according to prior art are no longer required. The installation of safety immersion cylinders, for example, for process gas on the burner, is always feasible according to the invention.

In an embodiment of the device the Claus plant is equipped with several Claus reactors. This corresponds to embodiments commonly used in prior art. However, in a further embodiment it is also possible to provide the Claus reactor only once as disclosed in an exemplary manner in EP 1527013 B1. Finally, the inventive device can also include pumps or conveying equipment for the liquid sulphur. The device or plant can, for example, also include blowers, separators, silencers, storage tanks or degasifiers. Of course, the vessel can also be equipped with suspension devices for dispatch.

To allow installation of the Claus plant at a higher level than the immersion chamber and the vessel, the Claus plant is supported, for example, on a platform or a base. This can be a grid tray, for example, to be supported on stilts.

Claim is also laid to a process for the condensation, separation and storage of liquid sulphur from a Claus process. Claim is particularly laid to a process for the condensation, separation and storage of liquid sulphur, in which
- the hydrogen sulphide is removed from the coke oven gas by gas scrubbing using an absorption liquid, the laden absorption liquid is regenerated and the hydrogen sulphide obtained in concentrated form is fed to the Claus plant, and
- the hydrogen sulphide is converted to sulphur in a Claus furnace by reacting with an oxygen-containing gas, and the combustion gas is fed to a waste heat boiler in which the liquid sulphur condenses, and
- the cooled process gas is fed to a Claus reactor in which part of the residual hydrogen sulphide is burnt to form sulphur dioxide, and the sulphur dioxide is converted to sulphur by reacting with hydrogen sulphide in the Claus reactor, and which is characterised in that
- the sulphur is fed in a siphon manner from the waste heat boiler and the Claus reactor to an immersion chamber housed in a vessel located at a lower level, the said vessel being located at ground level below the level of the entire Claus plant, and
- the immersion chamber is housed in a vessel taking up the liquid sulphur from the immersion chamber,
- with the flowing sulphur overcoming a difference in altitude of at least 4.00 meters by gravity.

In this context hydrogen sulphide refers to a gas or a fraction which contains hydrogen sulphide as the main constituent. This fraction may also contain organic sulphur compounds. In a preferred embodiment the sulphur is fed to the immersion chamber in liquid form and kept in the vessel at a temperature between 110° C. and 300° C. If there is an adequate flow of sulphur, the latter remains liquid of its own accord. It is preferably also possible to keep the sulphur at a temperature between 110° C. and 300° C. by heating it in the immersion chamber. This can be done by heating elements attached to the immersion chamber.

The inventive device and the inventive process have the following advantages: Conveying the liquid sulphur from the Claus plant to the storage facility is not required because the pipes are short on account of the difference in altitude to be overcome; the sulphur can be stored in the downstream heatable vessel even if no sulphur is temporarily taken from the plant such that a separate storage tank is not required. A deep pit is not required; the immersion cylinders which prevent the escape of desulphurised gas in Claus plants according to prior art are no longer required.

The invention is explained by a drawing. A sulphur-containing concentrate (3) is recovered from a coke oven gas (1, COG) by means of a gas scrubbing process (2) and burnt with atmospheric oxygen to give elemental sulphur, water and carbon dioxide in a Claus furnace (4). One obtains elemental sulphur (5) in gaseous form. This is fed to a waste heat boiler (6). In this, a tail gas (7) and liquid sulphur (8) are obtained by condensation, the tail gas (7) still containing sulphurous gases. These are completely burnt in the combustion stage (9) of a Claus reactor. One obtains sulphur dioxide (10). This is converted to form elemental sulphur in the catalyst stage (11) of a Claus reactor with condensation chamber by reacting with supplied hydrogen sulphide from the gas scrubbing process. One obtains a desulphurised combustion gas (12) or off-gas. This stage as well yields elemental sulphur (13) in liquid form. All plant sections (2 to 11) are supported on a base (14) which is, for example, a grid tray supported on stilts (15) at a higher level. The liquid sulphur from the waste heat boiler (8) and from the catalyst stage (11) is fed via pipes to an immersion chamber (16) equipped with a partition wall (17). As a result, this acts as a siphon. In this way, the total sulphur condenses. The sulphur is kept liquid by continued flowing and by heating and fed to a vessel (19) via a discharge nozzle (18). There it is stored in liquid or solid form depending on the demand.

LIST OF REFERENCE NUMBERS AND DESIGNATIONS

1 Coke oven gas
2 Gas scrubber
3 Sulphur-containing concentrate
4 Claus furnace
5 Elemental gaseous sulphur
6 Waste heat boiler
7 Sulphur-containing tail gas
8 Liquid elemental sulphur from the waste heat boiler
9 Combustion stage of the Claus reactor
10 Sulphur dioxide
11 Catalyst stage of the Claus reactor with condensation chamber
12 Desulphurised combustion gas
13 Liquid elemental sulphur from the Claus reactor
14 Base
15 Stilts
16 Immersion chamber
17 Partition wall
18 Discharge nozzle
19 Vessel

The invention claimed is:

1. A device for the condensation, separation and storage of liquid sulfur derived from a hydrogen sulfide-containing process gas, comprising:
   a) a gas scrubbing unit by means of which hydrogen sulfide is removed from the process gas by scrubbing with an absorbtion liquid, forming a hydrogen sulfide laden absorbtion liquid;
   b) an absorbtion liquid regeneration unit which removes hydrogen sulfide from the hydrogen sulfide laden absorbtion liquid, forming a hydrogen sulfide concentrated stream and a regenerated solvent stream;
   c) a Claus plant, comprising
   c)i) a Claus furnace in which the hydrogen sulfide concentrated stream from the absorbtion liquid regeneration unit is combusted with a gas containing oxygen to produce a first effluent stream containing containing elemental sulfur;
   c)ii) a waste heat boiler in which the effluent stream containing elemental sulfur is cooled to a temperature sufficient to condense the elemental sulfur to liquid sulfur;
   c)iii) at least one Claus reactor which receives a sulfur depleted process stream from the waste boiler, the sulfur-depleted process stream containing residual hydrogen sulfide, combusting at least a portion of the residual hydrogen sulfide to form sulfur dioxide, and catalytically reacting the sulfur dioxide with hydrogen sulfide to form a second effluent stream containing elemental sulfur;
   c)iv) a condensing unit which receives the second effluent stream containing elemental sulfur and condenses elemental sulfur in the second effluent stream to liquid sulfur;
   g) a siphon-type immersion chamber, contained within a heatable ground level vessel, which receives liquid sulfur streams from the waste heat boiler c)ii) of the Claus plant and from the condenser c)iv) of the Claus plant, wherein liquid sulfur flows from the immersion chamber through a discharge point,
   wherein the lowest discharge point of the immersion chamber is positioned at least 4 m below the Claus plant, such that liquid sulfur can flow to the immersion chamber without the aid of conveying equipment.

2. The device for the condensation, separation and storage of liquid sulfur of claim 1, wherein the vessel and the immersion chamber are made of steel.

3. The device of claim 2, comprising a plurality of Claus reactors.

4. The device of claim 2, wherein the Claus plant is positioned above ground level such that the discharge point of the immersion chamber is at least 4 m below the Claus plant.

5. The device of claim 4, wherein the Claus plant is mounted on an elevated platform or base.

6. The device of claim 4, wherein the Claus plant is mounted on a grid tray, supported by stilts.

7. The device for the condensation, separation and storage of liquid sulfur of claim 1, wherein the immersion chamber is equipped with a device for heating of sulfur.

8. The device for the condensation, separation and storage of liquid sulfur of claim 1, further comprising at least one collecting or storage tank for liquid sulfur, connected by piping to the vessel.

9. The device of claim 8, wherein the collecting and/or storage tanks are made of steel.

10. The device of claim 1, wherein the vessel functions as a storage tank for liquid sulfur, and liquid sulfur flows from the discharge point of the immersion chamber into the vessel.

11. The device of claim 10, wherein the immersion chamber is at least partially immersed in liquid sulfur in the vessel.

12. The device for the condensation, separation and storage of liquid sulfur of claim 1, wherein the immersion chamber contains a partition, liquid sulfur flowing into the immersion chamber on one side of the partition and flowing below the partition to the other side of partition to the discharge point.

13. A process for the condensation, separation and storage of liquid sulfur from a hydrogen sulphide-containing gas, comprising:

removing hydrogen sulphide from the gas by scrubbing with an absorption liquid, producing a hydrogen sulphide laden absorbtion liquid, regenerating the laden absorption liquid and directing hydrogen sulphide obtained in concentrated form to a Claus plant;

converting hydrogen sulphide to sulfur in a Claus furnace by combusting with an oxygen-containing gas to form a combustion gas, feeding the combustion gas to a waste heat boiler, and condensing liquid sulfur from the combustion gas to form a stream of liquid sulfur and a cooled process gas; and feeding the cooled process gas to a Claus reactor, burning at least part of residual hydrogen sulphide contained in the process gas to form sulfur dioxide, and converting the sulfur dioxide to sulfur by reacting with hydrogen sulphide in the Claus reactor, and siphoning the sulfur from the waste heat boiler and the Claus reactor to an immersion chamber housed in a vessel located at a lower level, the vessel being located at ground level below the Claus plant, liquid sulfur flowing from the immersion chamber into the vessel, wherein the flowing sulfur overcomes a difference in altitude of at least 4 meters by gravity flow.

14. The process for the condensation, separation and storage of liquid sulfur of claim 13, wherein the sulfur is fed to the immersion chamber at a temperature between 110° C. and 300° C.

15. The process for the condensation, separation and storage of liquid sulfur of claim 13, wherein the sulfur is kept at a temperature between 110° C. and 300° C. by heating it in the immersion chamber and the vessel.

* * * * *